W. B. AND P. S. LONGEST.
TOOL FOR TESTING AND STRAIGHTENING AXLES.
APPLICATION FILED APR. 10, 1920.
1,363,890. Patented Dec. 28, 1920.
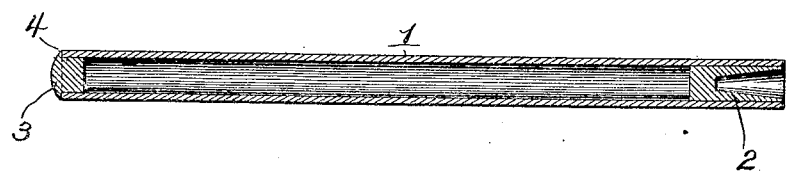
Inventors
W. B. and P. S. Longest
By Seymour & Bright
Attorneys

UNITED STATES PATENT OFFICE.

WILLIAM B. LONGEST AND PHILIP S. LONGEST, OF LOUISVILLE, KENTUCKY.

TOOL FOR TESTING AND STRAIGHTENING AXLES.

1,363,890.  Specification of Letters Patent.  Patented Dec. 28, 1920.

Application filed April 10, 1920. Serial No. 372,835.

*To all whom it may concern:*

Be it known that we, WILLIAM B. LONGEST and PHILIP S. LONGEST, citizens of the United States, and residents of Louisville, in the county of Jefferson and State of Kentucky, have invented certain new and useful Improvements in Tools for Testing and Straightening Axles; and we do hereby declare the following to be a full, clear, and exact description of the invention, such as will enable others skilled in the art to which it appertains to make and use the same.

Our invention relates to an improved tool for testing and straightening axles, and it consists in the details of construction as will be more fully explained and pointed out in the claims.

The accompanying drawing is a view in longitudinal section of the tool.

The tool consists of a heavy metal bar 1, preferably about five or six feet long and about two and one-half inches in diameter provided at one end with a socket 2 made tapering to fit the spindle of a live axle, and provided at its opposite end with a head 3 preferably rounded as shown. We prefer to make the bar 1 tubular in order to reduce its weight, and when so made the head 3 will be of a separate piece secured within the end and having a flange or shoulder 4 overlapping the end of the tube, and the socket 2 will also be of a separate piece preferably removably secured within the other end of the bar. The socket 2 is made tapering to conform to and sungly fit the spindle of the axle and when driven thereon makes a tight fit with the long axis of the bar or lever in the plane of the long axis of the axle. As the bar is perfectly straight and true, it will be seen that by turning the axle and the bar if the former be out of true or slightly bent, it will be indicated by the inclination of the bar. If the bend in the axle be slight it will be magnified greatly at the free end of the long bar and can be corrected by the application of pressure properly applied to the outer end of the bar.

The bar can be readily and rapidly applied to axles, and when applied it is simply necessary to roll or turn the axle with the bar thereon in order to ascertain whether it is perfect and any imperfection in the way of a bend will be indicated by the inclination of the bar and can be corrected by the proper application of power at the long end of the bar.

After the axle has been tested the bar is removed by rapping the socketed end with a hammer if necessary and may then be applied to another, the operation of testing being carried on rapidly without any tools other than the bar and a hammer for attaching the bar to the axle spindle.

If desired the socket 2 may be removable so as to be replaced when worn, or if desired by another having a socket for a different size spindle.

Having fully described our invention what we claim as new and desire to secure by Letters-Patent, is:

1. A tool for testing and straightening axles comprising a long bar provided at one end with a tapering socket conforming in size to and adapted to snugly fit the axle spindle, and having a head at its other end.

2. A tool for testing and straightening axles comprising a long hollow bar, a tapering socket in one end to receive a tapering spindle and a head closing the other end of the bar.

In testimony whereof we have signed this specification in the presence of two subscribing witnesses.

WILLIAM B. LONGEST.
PHILIP S. LONGEST.

Witnesses:
 ADA M. YENTSCH,
 FRED J. HARBSMEIER.